(12) United States Patent
Zhu et al.

(10) Patent No.: US 11,374,272 B2
(45) Date of Patent: Jun. 28, 2022

(54) NI—MN BASED HEUSLER ALLOYS FOR THERMAL REGULATION APPLICATIONS

(71) Applicants: Toyota Motor Engineering & Manufacturing North America, Inc., Plano, TX (US); The Board of Trustees of the University of Illinois, Champaign, IL (US)

(72) Inventors: Gaohua Zhu, Ann Arbor, MI (US); Qiye Zheng, Beijing (CN); Debasish Banerjee, Ann Arbor, MI (US); David G. Cahill, Champaign, IL (US)

(73) Assignees: Toyota Motor Engineering & Manufacturing North America, Inc., Plano, TX (US); The Board of Trustees of the University of Illinois, Champaign, IL (US)

( * ) Notice: Subject to any disclaimer, the term of this patent is extended or adjusted under 35 U.S.C. 154(b) by 261 days.

(21) Appl. No.: 16/264,376

(22) Filed: Jan. 31, 2019

(65) Prior Publication Data
US 2020/0251792 A1    Aug. 6, 2020

(51) Int. Cl.
*H01M 10/653* (2014.01)
*H01M 10/0525* (2010.01)
*H01M 10/625* (2014.01)
*H01M 10/655* (2014.01)

(52) U.S. Cl.
CPC ..... *H01M 10/653* (2015.04); *H01M 10/0525* (2013.01); *H01M 10/625* (2015.04); *H01M 10/655* (2015.04); *H01M 2220/20* (2013.01)

(58) Field of Classification Search
CPC .......... H01M 10/653; H01M 10/0525; H01M 10/625; H01M 10/655; H01M 10/6551; H01M 2220/20
See application file for complete search history.

(56) References Cited

U.S. PATENT DOCUMENTS

| 2014/0265554 A1* | 9/2014 | Yang | B60L 3/0069 307/9.1 |
|---|---|---|---|
| 2017/0125866 A1* | 5/2017 | Zhou | H01M 10/60 |
| 2018/0066875 A1 | 3/2018 | Ihnfeldt et al. | |
| 2018/0330903 A1* | 11/2018 | Yamaguchi | H01F 1/0009 |

OTHER PUBLICATIONS

Chen et al., Calorimetric and magnetic study for Ni50MN36In14 and relative cooling power in paramagnetic inverse magnetocaloric systems, Nov. 24, 2014, J. Applu. Phys. 116, 203901 (Year: 2014).*

(Continued)

*Primary Examiner* — Adam A Arciero
(74) *Attorney, Agent, or Firm* — Christopher G. Darrow; Darrow Mustafa PC

(57) ABSTRACT

Thermal management systems include a heat generating device that is to be kept within a desired temperature range. A thermoregulating layer coats, or is otherwise positioned in adjacent proximity to the heat generating device. The thermoregulating layer includes a Ni—Mn based Heusler alloy that exhibits an unprecedented differential in thermal conductivity across a relevant temperature range, based on a martensitic transition from an asymmetric lattice structure to a symmetric lattice structure with increasing temperature.

20 Claims, 7 Drawing Sheets

(56) References Cited

OTHER PUBLICATIONS

Entel et al., Interaction of Phase Transformation and Magnetic Properties of Heusler Alloys: A Density Functional Theory Study, 2013, JOM, vol. 65, No. 11 (Year: 2013).*

Batdalov et al., Magnetic, Thermal, and Electrical Properties of an Ni45.37Mn40.91In13.72 Heusler Alloy, 2016, Journal of Experimental and Theoretical Physics, 2016, vol. 233, No. 5, pp. 874-882 (Year: 2016).*

Wehmeyer, G. et al., "Thermal diodes, regulators, and switches: Physical mechanisms and potential applications," Applied Physics Reviews 4, pp. 041304-1-041304-32 (2017).

Oh, D. et al., "Thermal conductivity and dynamic heat capacity across the metal-insulator transition in thin film VO2," Appl. Phys. Lett. 96, 151906 (2010) (Abstract only).

\* cited by examiner

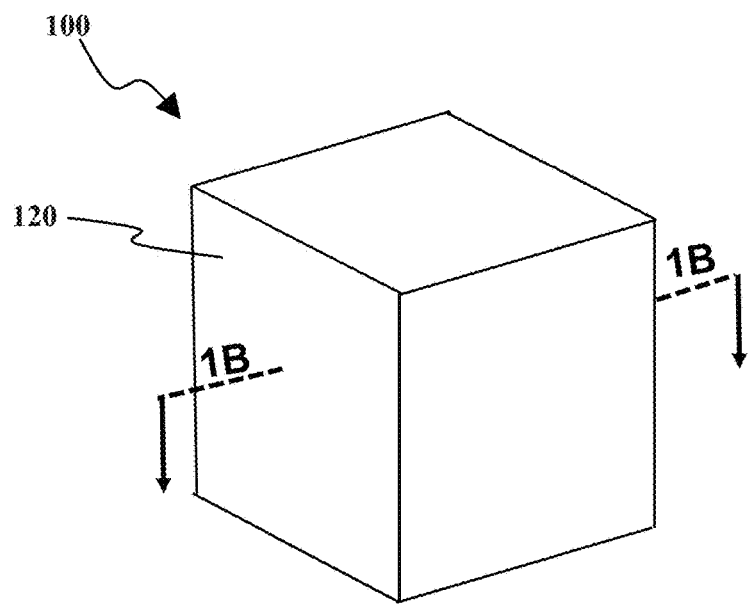
FIG. 1A
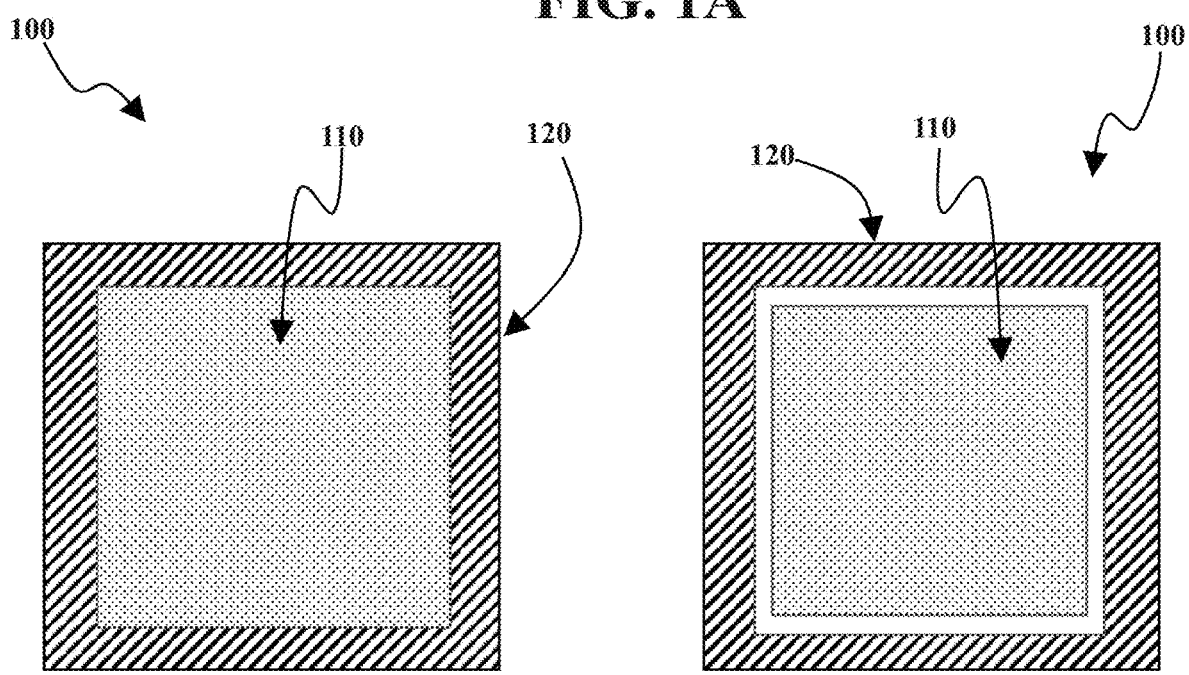
FIG. 1B  FIG. 1C

FIG. 4
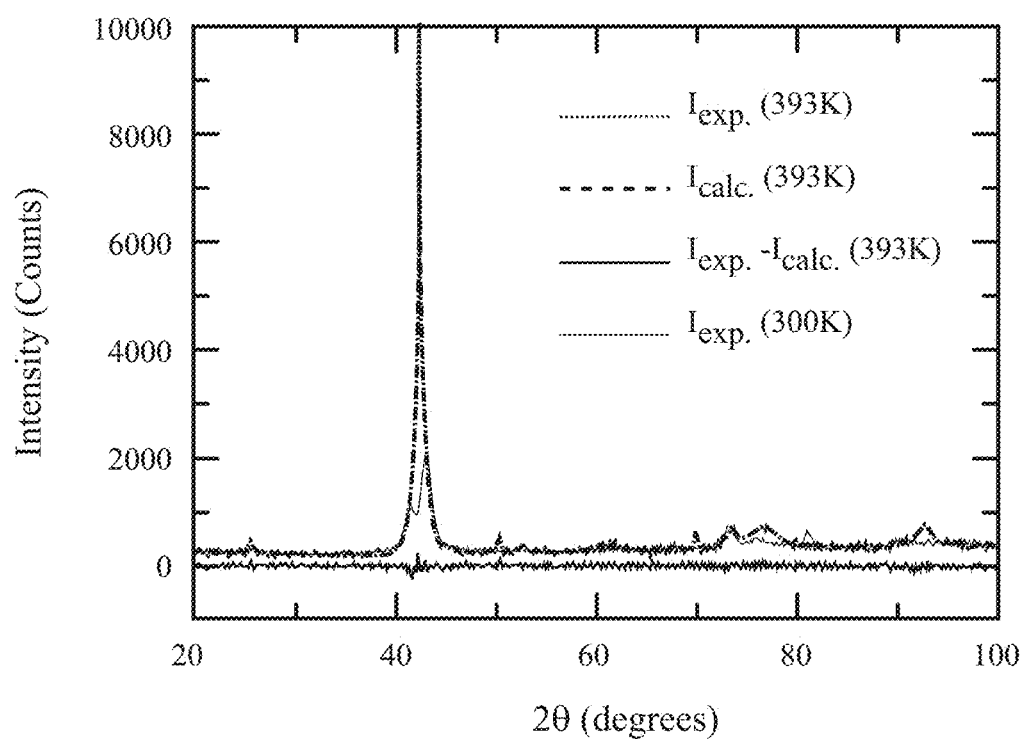
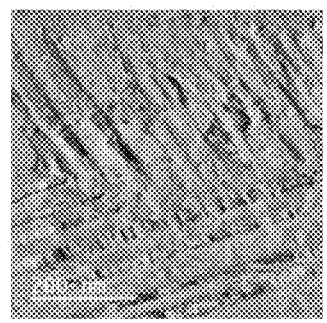
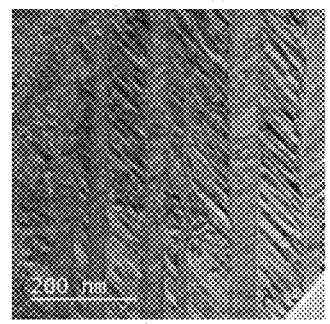
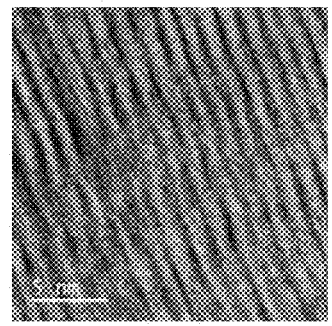
FIG. 5A      FIG. 5B      FIG. 5C

NI—MN BASED HEUSLER ALLOYS FOR THERMAL REGULATION APPLICATIONS

TECHNICAL FIELD

The present disclosure generally relates to thermal regulators, and more particularly, to solid state materials for thermal management.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Thermal management systems are utilized to maintain heat producing devices within a desired, optimal temperature range. In the context of motor vehicles, combustion engines or batteries perform non-optimally when below a given temperature range, such as immediately after startup, or above a given temperature range, such as during intensive, prolonged operation.

Some conventional thermal management systems use mechanical means to retain heat at the device when the temperature is low, and to allow heat to escape when the temperature is high. Such means can be cumbersome and/or prone to failure. Solid state thermal management systems, based on materials that undergo an intrinsic thermal conductivity change as a function of changing temperature, have to potential to provide superior reliability while saving space. Current state of the art materials have insufficient magnitude of thermal conductivity change as a function of temperature for many applications.

Accordingly, it would be desirable to provide thermal management systems and methods of making the same, utilizing improved thermally responsive solid state materials.

SUMMARY

This section provides a general summary of the disclosure, and is not a comprehensive disclosure of its full scope or all of its features.

In various aspects, the present teachings provide a thermal management system. The system includes a heat generating device, and a thermoregulating layer in proximity to one or more surfaces of the heat generating device. The thermoregulating layer comprising includes a ternary alloy of nickel, manganese, and a third metal selected from the group consisting of indium, gallium, tin, and antimony.

In other aspects, the present teachings provide a battery, such as a Li-ion battery for an electric vehicle, having a thermal management system. The system includes a battery, and a thermoregulating layer in proximity to one or more surfaces of the battery. The thermoregulating layer comprising includes a ternary alloy of nickel, manganese, and a third metal selected from the group consisting of indium, gallium, tin, and antimony.

In still other aspects, the present teachings provide a method for constructing a thermal management system having thermal management properties tuned to a heat generating device. The method includes a step of identifying a critical threshold temperature of the heat generating device. The method also includes a step of providing a plurality of Ni—Mn based Heusler alloys having a formula, $Ni_xMn_{y-z}M_z$. M can be one of indium, gallium, tin, and antimony; x is a value within a range of from about 48 to about 52, inclusive; y is a value within a range of from about 48 to about 52, inclusive; and z is a value within a range of from about 13 to about 15, inclusive. The method further includes a step of measuring the change in thermal conductivity across a desired temperature range for each Ni—Mn based Heusler alloy of the plurality. The method further includes a step of selecting a specific Ni—Mn based Heusler alloy from the plurality, based on a correlation between the change in thermal conductivity of the Ni—Mn based Heusler alloy and the critical threshold temperature of the heat generating device. The method additionally includes a step of applying a thermoregulating layer 120, including the selected Ni—Mn based Heusler alloy, to one or more surfaces of the heat generating device Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1A is a perspective, schematic view of a thermal management system of the present teachings;

FIG. 1B is a cross sectional view of the system of FIG. 1A, viewed along the line 1B-1B;

FIG. 1C is an cross sectional view of an alternative deployment of the system of FIG. 1A, also viewed along the line 1B-1B

FIG. 4 an x-ray diffraction (XRD) spectrum of Ni—Mn—In alloy, that can be used in a thermoregulating layer of a system of the present teachings, at room temperature and elevated temperature;

FIGS. 5A-5C are transmission electron microscopy (TEM) images of the Ni—Mn—In alloy of FIG. 4;

Figure 2:
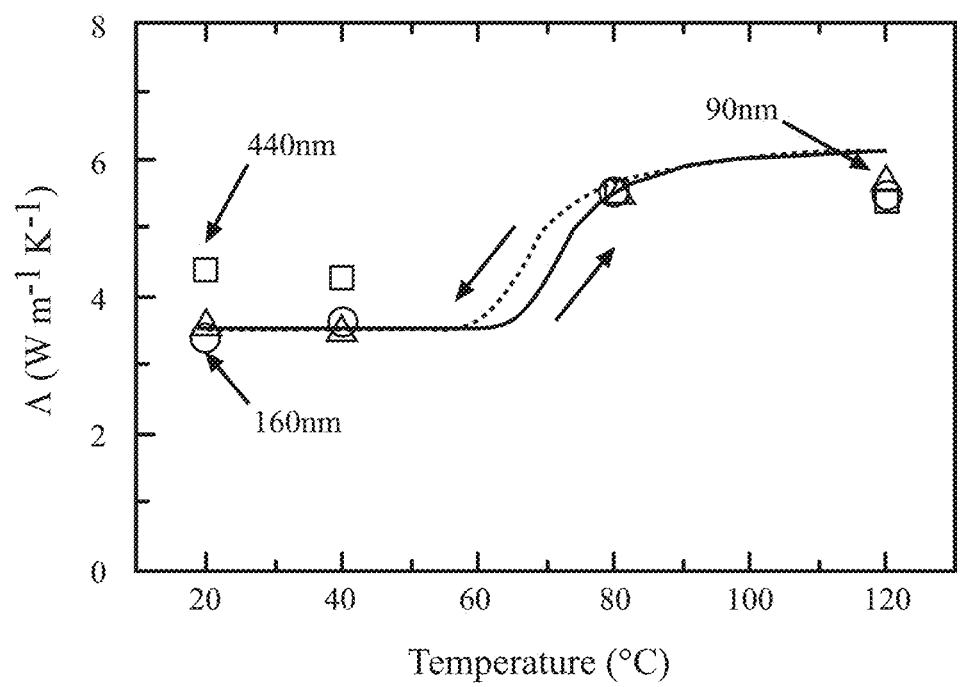
FIG. 2 is a plot of thermal conductivity as a function of temperature for a state of the art thermal regulator material, vanadium oxide ($VO_2$)

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide thermal management systems that allow heat generating devices to retain heat when operating at low temperature, and then dissipate heat to the environment when operating at elevated temperature. The systems of the present teachings include solid-state thermal regulation coatings having an unusually high thermal conductivity change at the transition temperature. This allows efficient thermal switching with minimal space requirement and no possibility of mechanical failure.

Systems of the present teachings include a heat generating device, such as a vehicle engine or portion thereof, or a battery. Systems of the present teachings further include a thermoregulating layer, having a ternary alloy of nickel, manganese, and a selected post-transition metal or metalloid. As shown below, the ternary alloy has a pronounced temperature-dependent thermal conductivity switch, based on carrier mobility.

Thus, and with reference to FIGS. 1A-1C. 1, a thermal management system 100 of the present teachings can include a heat generating device 110. In many implementations, the heat generating device 110 can be a type that would commonly be found in a motor vehicle, such as the engine block in the example of FIGS. 1A-1C, or the battery of an electric or hybrid vehicle.

The heat generating device 110 can be at least partially surrounded by a thermoregulating layer 120 configured to maintain the temperature of the heat generating device 110 within a desired range. In some implementations, the thermoregulating layer 120 can contact and coat one or more surfaces of the heat generating device 110. In some implementations, the thermoregulating layer 120 can be spaced apart from and adjacent to one or more surfaces of the heat generating device 110. Because the thermoregulating layer 120 is generally in contacting or adjacent proximity to the heat generating device 110, the thermoregulating layer 120 will tend to have a temperature near or equal to that of the heat generating device 110. It will be understood that the thermoregulating layer 120 functions as a thermal switch, having low thermal conductivity when at low temperature, and high thermal conductivity when at high temperature. Thus, the thermoregulating layer 120 can function as a thermal insulator, retaining heat in the heat generating device 110 when the heat generating device 110 is at low temperature, and as a thermal conductor, allowing heat to migrate away from the heat generating device 110 when the heat generating device 110 is at high temperature.

It will be understood that a thermoregulating layer 120 of the present teachings will beneficially be formed, at least in part, of a material having the property described above: relatively low thermal conductivity when the material is below a thermal transition temperature; and relatively high thermal conductivity when the material is above a thermal transition temperature. Such a material can be termed a "thermal switch" material. A thermoregulating layer 120 of the present teachings can generally be formed, at least in part, of a heat switch material that is an off-stoichiometric ternary alloy of: nickel; manganese; and a third metal. The third metal can, in some implementations, be selected from the group consisting of indium, gallium, tin, and antimony. As shown below, this ternary alloy—referred to alternatively herein as a Ni—Mn based Heusler alloy, exhibits an unusually large and abrupt change in thermal conductivity with changing temperature. It will be understood that this property makes the ternary alloy an ideal material for use in the thermoregulating layer 120.

In certain particular implementations, the Ni—Mn based Heusler alloy can have a formula according to Formula I:

$$Ni_xMn_{y-z}M_z \qquad I;$$

where M is selected from the group consisting of indium, gallium, tin, and antimony; x is a value within a range of from about forty eight to fifty two; y is a value within a range of from about forty eight to fifty two; and z is a value within a range of from about thirteen to about fifteen, inclusive. It is to be understood that the stoichiometric quantities can vary somewhat from those indicated in Formula I. In some implementations, M can include two or metal metals selected from the group consisting of indium, gallium, tin, and antimony. In general terms, the formula of a Ni—Mn based Heusler alloy of the present teachings can be $Ni_{50}Mn_{50-z}M_z$, where the value of fifty in the stoichiometric quantities of nickel and manganese can vary by several percent, or up to five percent. Stated alternatively, the Ni—Mn based Heusler alloys of the present teachings can be off-stoichiometric compounds of the approximate formula $Ni_{50}Mn_{50-z}M_z$.

As shown below, the Ni—Mn based Heusler alloys of the present teachings exhibit unusually large thermal conductivity transitions with changing temperature. FIG. 2 shows a plot of thermal conductivity as a function of temperature for vanadium oxide ($VO_2$) thin films of varying thickness [adapted from Appl. Phys. Lett. 96, 151906 (2010) by Oh et al.]. It will be understood that $VO_2$, a state-of-the-art solid-state thermal regulator material, is a conventional martensitic type metal-insulator transition (MIT) thermal regulator. The data represented in FIG. 2 show that $VO_2$, like other state-of-the art thermal regulating materials, possesses relatively low thermal conductivity ($<10$ W·m$^{-1}$·K$^{-1}$) in the metallic phase, which is generally understood to be due to very low electron mobility. It is further apparent that $VO_2$, in the example of FIG. 2, exhibits a thermal conductivity change across the transition temperature (i.e. the phase change) of about 2 W·m$^{-1}$·K$^{-1}$.

Figure 3:
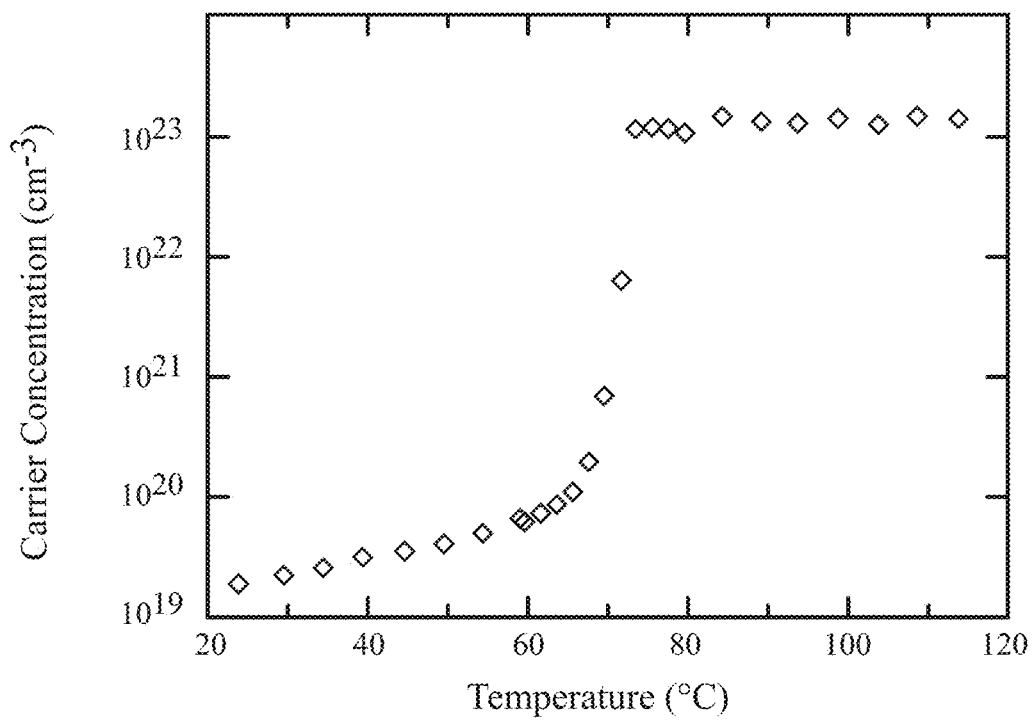
FIG. 3 is a plot of carrier concentration as a function of temperature in $VO_2$.

FIG. 3 [adapted from Appl. Phys. Lett. 107, 262108 (2015) by Kenaci et al.] shows a plot of carrier concentration increase in $VO_2$ across a temperature range comparable to that of FIG. 2. It is apparent that $VO_2$ exhibits a large, orders of magnitude, increase in carrier concentration across the transition temperature. It will thus be appreciated that, in the instance of $VO_2$ and other state of the art thermal regulation materials, the thermal regulation mechanism is driven primarily the electron carrier concentration change due to the structural transition. Because as electron concentration increases, electron-phonon scattering increases too. It can further be understood that increased electron-phonon scattering at temperatures above the transition temperature can lower the lattice thermal conductivity, thereby offsetting the gains from carrier concentration and limiting the total increase in thermal conductivity across the transition temperature.

Thus the Ni—Mn based Heusler alloys of the present teachings are configured to exhibit an increase in carrier concentration across the transition temperature, while also exhibiting a decrease in electron-phonon scattering (i.e. an increase in carrier mobility), thereby achieving total thermal conductivity increases superior to those of state of the art thermal regulating materials.

FIG. 4 shows a series of experimental and calculated x-ray diffraction (XRD) data for a thermal regulating material of the present teachings, having a formula $Ni_{50.3}Mn_{34.8}In_{14.9}$, at room temperature and at about 120° C. The light dotted line and the heavy dotted line are the experimental measurement data at 120° C. and the data calculated for a cubic structure, respectively. The heavy solid line is the difference between the two aforementioned lines, confirming that they are identical, and that the thermal regulating material is cubic at 120° C., above the transition temperature. The light solid line is the room temperature (300K) XRD spectrum, and confirms that the Ni—Mn based Heusler alloy is monoclinic at the temperature below the transition temperature. Thus, the thermal regulating material transitions from a less symmetric monoclinic structure to a more symmetric cubic structure as its temperature increases across the transition temperature.

FIGS. 5A-5C show a series of transmission electron microscopy (TEM) images at room temperature. It is evident that there are many twin domains formed due to the different orientations of the monoclinic martensite. In particular, the martensite structure contains a two-level hierarchy, the large twin domains that vary in scale from tens of nanometers to about 100 nm. These domains are further composed of even smaller nanometer wide internal twins, as shown in FIG. 5C. It will be understood that the high strain defects lead to high phonon (lattice) scattering, and thus low thermal conductivity, for the low temperature phase. When considered in conjunction with the results of FIG. 4, it can be expected that as temperature increases across the transition temperature, martensitic transition can cause the crystal structure to transform into a more symmetric cubic phase, reducing these asymmetries/defects and thereby increasing thermal conductivity.

FIGS. 6A-6D show the thermal conductivities as a function of temperature across a range of 300 K to 500 K, of four different exemplary thermal regulator materials of the present teachings. Black squares show total thermal conductivity ($\Lambda_{tot}$) as the sample is heated across the temperature range, open squares show total thermal conductivity as the sample is cooled across the temperature range, and open circles show the electronic thermal conductivity ($\Lambda_e$), as calculated from electrical conductivity measurements. The four samples examined in FIGS. 6A-6D have formulae $Ni_{51.7}Mn_{34.3}In_{13.9}$, $Ni_{50.7}Mn_{35.00}In_{14.3}$, $Ni_{50.3}Mn_{35.6}In_{14.1}$, and $Ni_{50.3}Mn_{34.8}In_{14.9}$, respectively. The results of FIGS. 6A-6D show much greater changes in thermal conductivity across the temperature range than has been observed in other materials. In particular, each thermal regulation material evaluated in FIGS. 6A-6D showed a change in total thermal conductivity of about 10 to 12 $W \cdot m^{-1} \cdot K^{-1}$ (i.e. from about 7 $W \cdot m^{-1} \cdot K^{-1}$ at room temperature to nearly 18 $W \cdot m^{-1} K^{-1}$ at 230° C.) across the temperature range. This is in contrast to the change in thermal conductivity of about 2 $W \cdot m^{-1} \cdot K^{-1}$ observed for $VO_2$ (see FIG. 2, above) and other state of the art thermal regulation materials.

It can further be seen that the change in electronic thermal conductivity makes a significant, but incomplete, contribution to the total thermal conductivity change, and appears to exhibit a fairly abrupt change in electronic thermal conductivity at the transition temperature. It can also be seen that the transition temperature appears to vary slightly for the different samples, from about 320 K for the example of FIG. 6D to about 370 K for the example of FIG. 6A, shifts that are observable in the total thermal conductivity change. Such a property suggests an ability to tune the thermal management system 100, as discussed below.

Figure 6A:
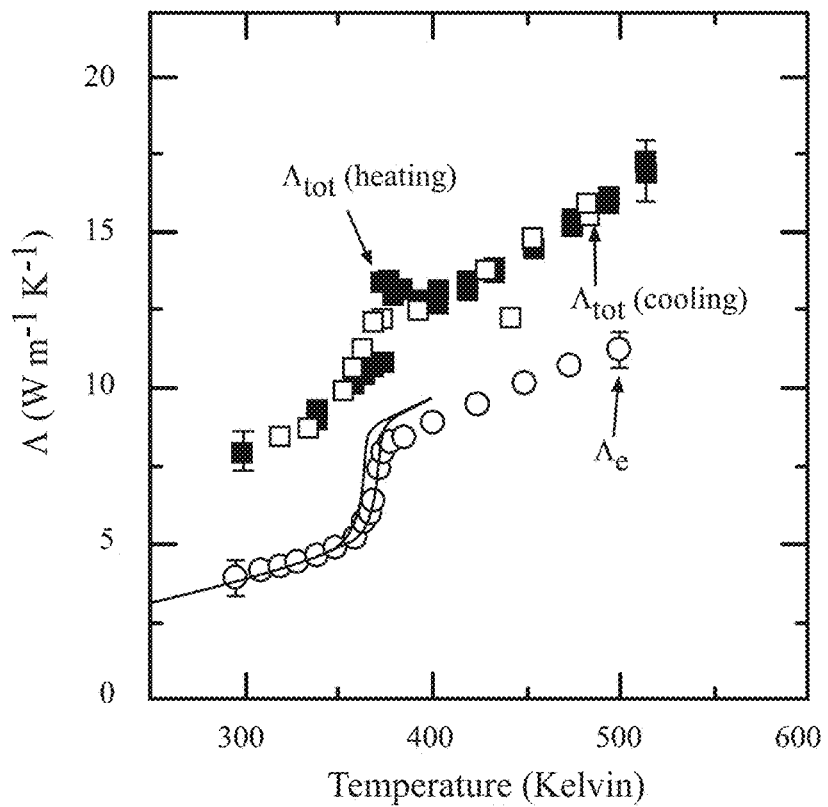
FIGS. 6A-6D are plots of thermal conductivity as a function of temperature for five samples of Ni—Mn—In alloy of the present teachings.
Figure 6B:
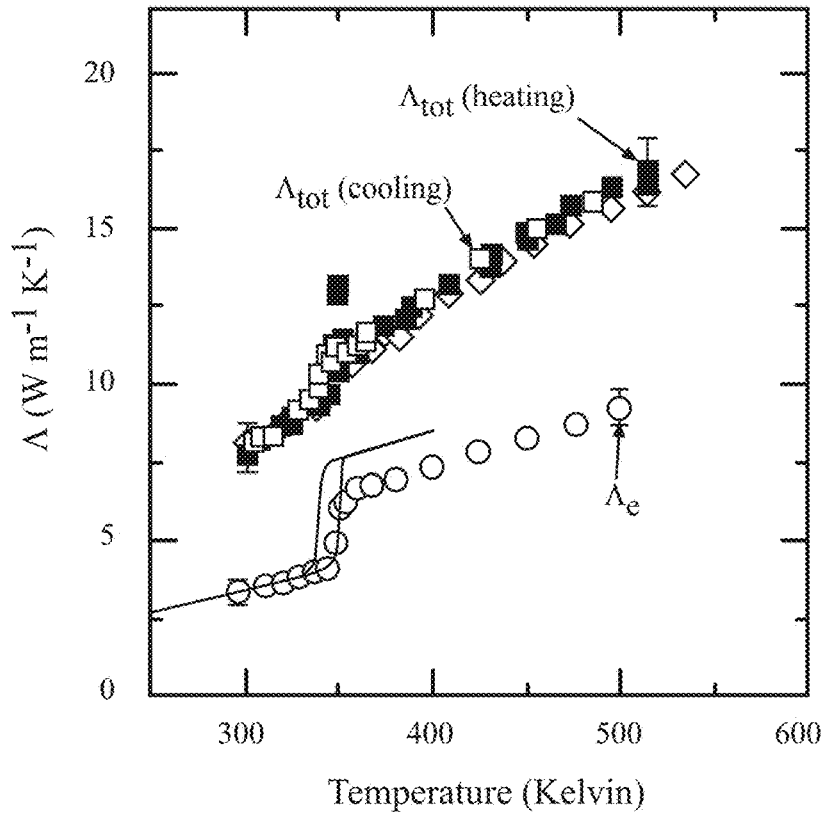
Figure 6C:
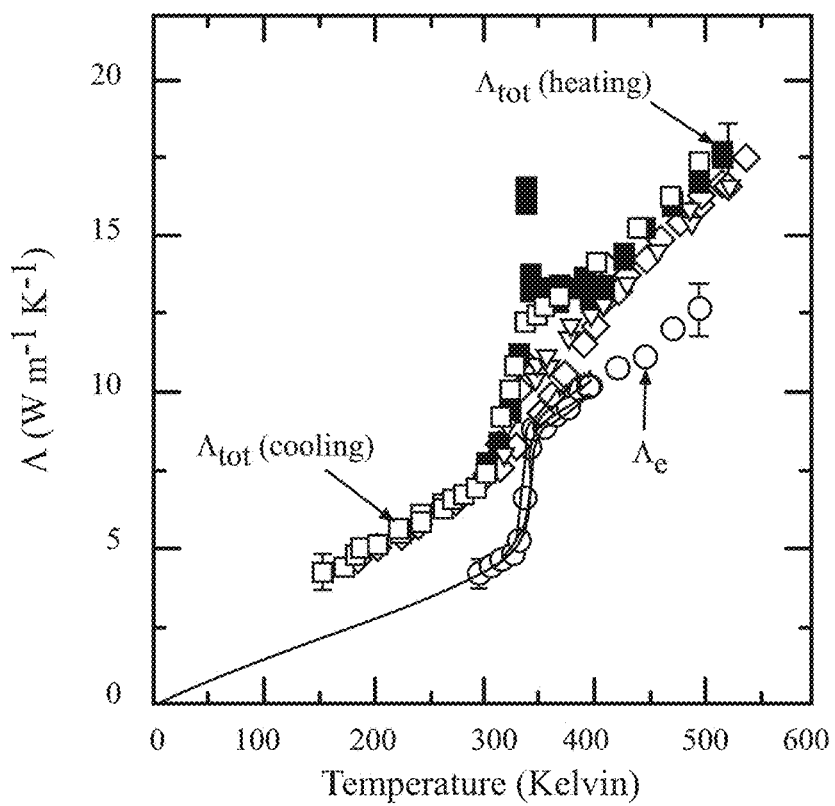
Figure 6D:
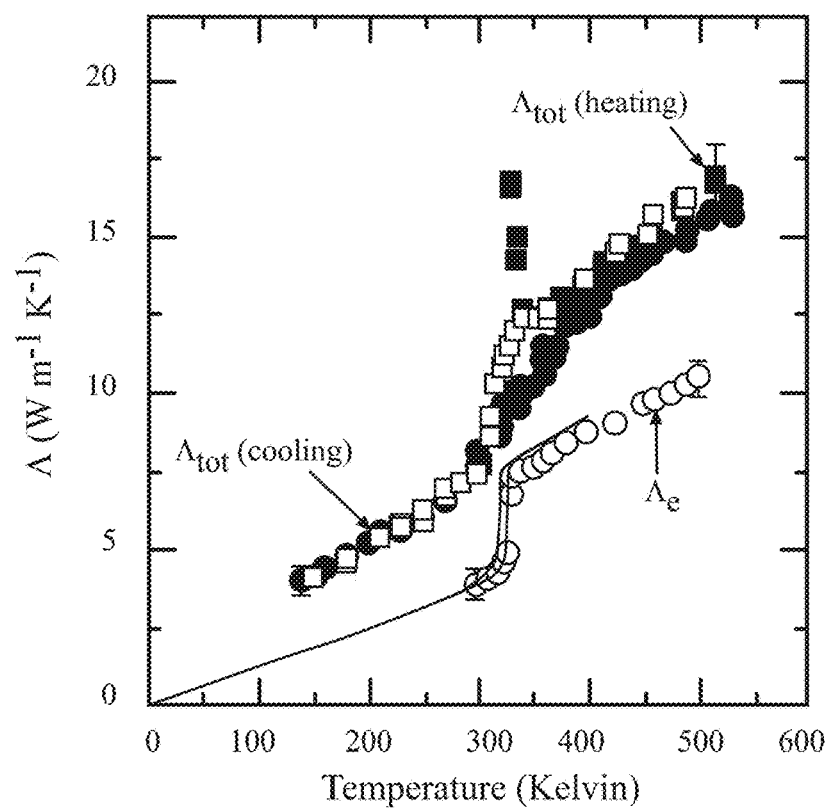
Figure 7A:
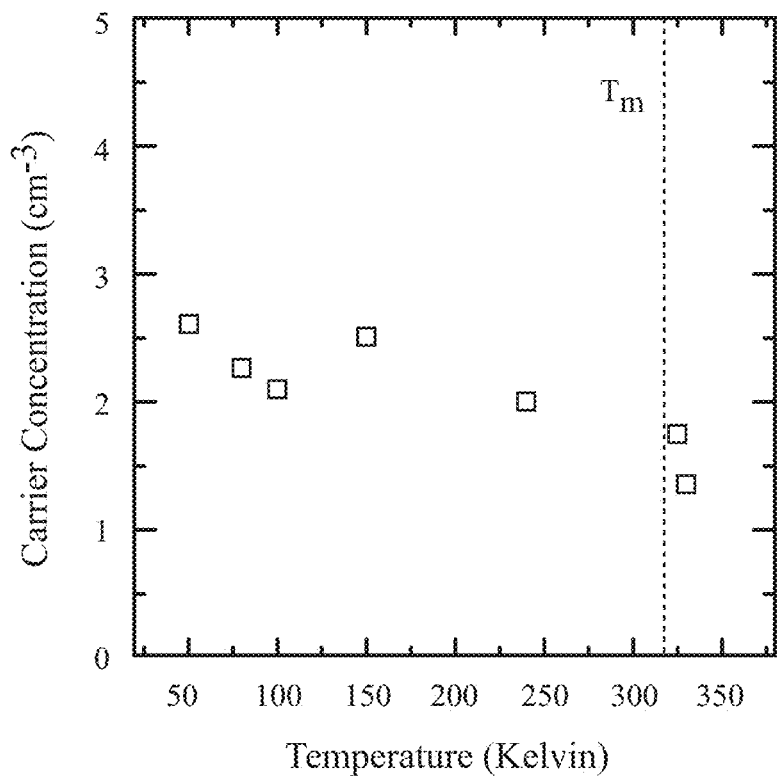
FIG. 7A is a plot of carrier concentration as a function of temperature for the alloy of FIG. 6D.
Figure 7B:
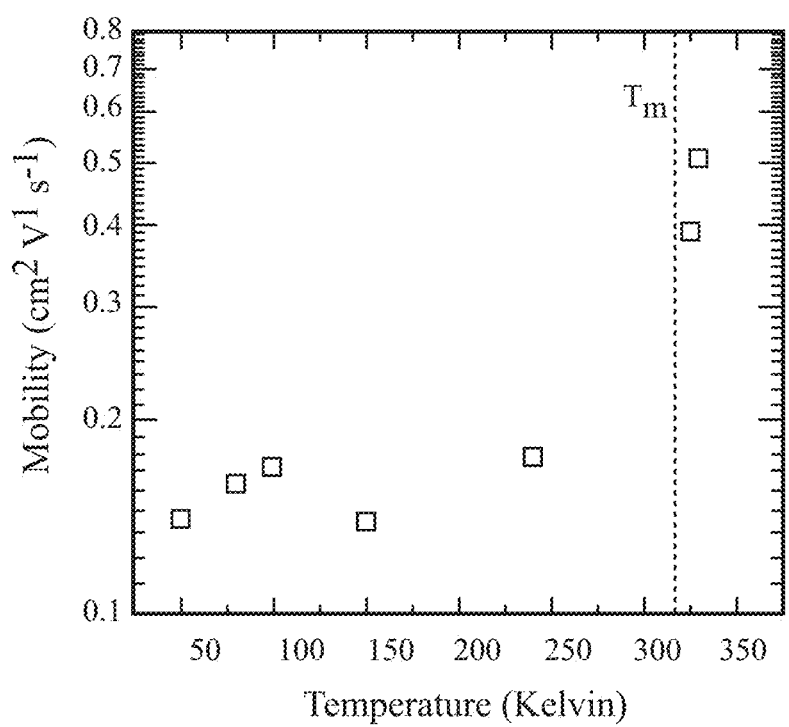
FIG. 7B is a plot of carrier mobility as a function of temperature for the alloy of FIG. 6D.

FIGS. 7A and 7B show the carrier concentration and mobility, as measured by the Hall effect, at varying temperature for the Ni—Mn based Heusler alloy of FIGS. 4 and 6D. The results show little-to-no increase in carrier concentration at the transition temperature, but a significant increase in mobility across the transition temperature. This results suggests that, unlike any state of the art thermal regulation materials, the mechanism of electrical conductivity increase across the phase transition in the disclosed Ni—Mn based Heusler alloys is not induced by carrier concentration. Instead, it is driven by significantly increased mobility, presumably due to diminished electron scattering associated with the transition to the ordered cubic phase.

Figure 8:
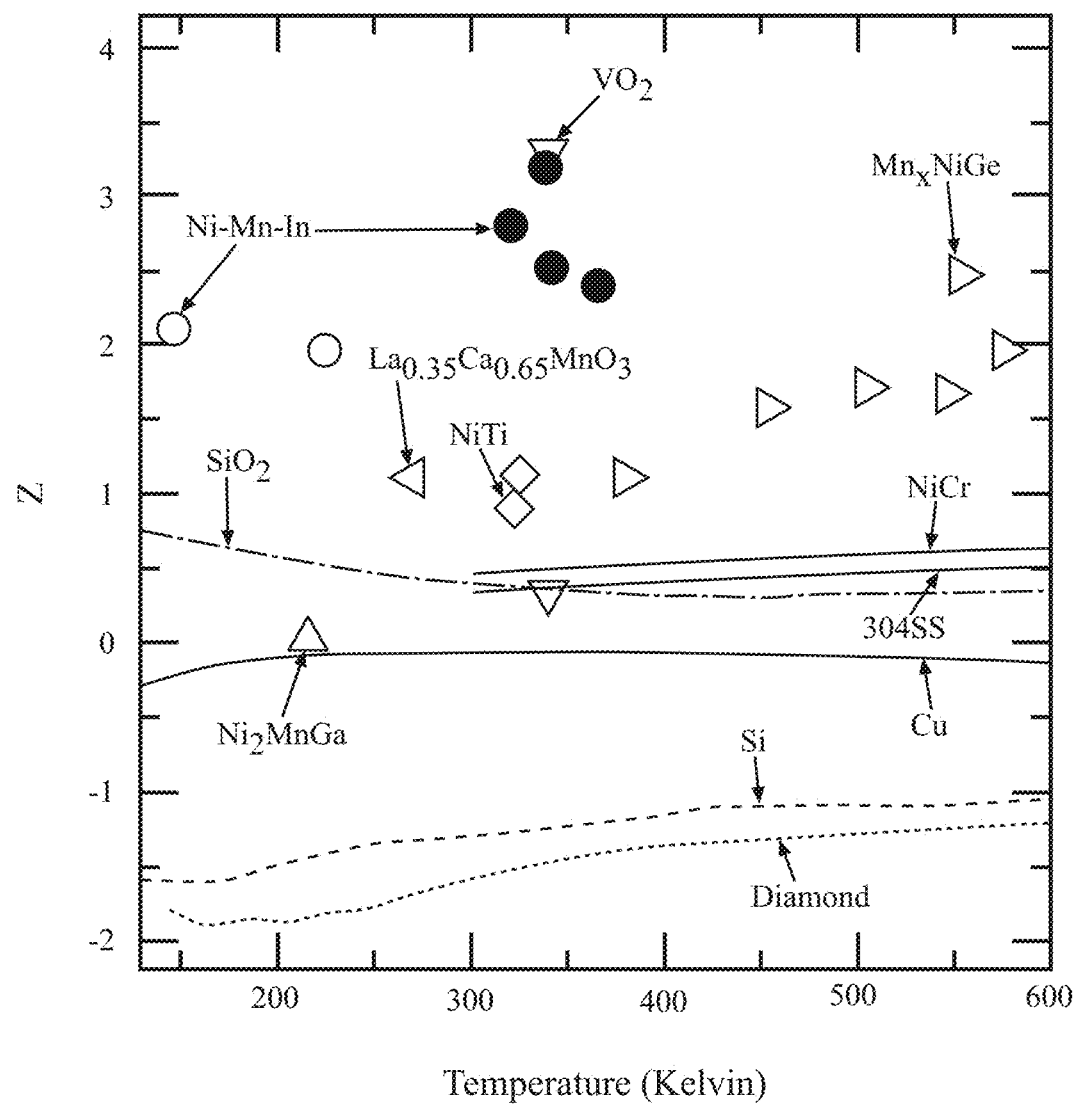
FIG. 8 is a plot of the base 10 logarithm of rate of change in thermal conductivity, as a function of temperature for the alloy of FIG. 5D.

FIG. 8 shows logarithmic rate of change in the thermal conductivity, Z, at different temperatures for various state of the art thermal regulation materials as well as Ni—Mn based Heusler alloys of the present teachings. Z, as depicted on the y-axis of FIG. 8, is defined according to Equation A:

$$Z = \frac{\partial \ln \Lambda}{\partial \ln T}. \qquad A$$

It will be understood that a larger value for Z corresponds to a faster change in thermal conductivity.

As shown in FIG. 8, the values of Z for Ni—Mn based Heusler alloys are higher than those of any of the comparative state of the art materials, with the exception of $VO_2$. It will be noted, however, with reference to FIGS. 2 and 8, that while $VO_2$ has a large rate of change in thermal conductivity, $VO_2$ has relatively much lower absolute thermal conductivity at both low and high temperatures. Thus, $VO_2$ is substantially insulative at all temperatures, whereas the Ni—Mn based Heusler alloys of the present teachings exhibit both a high rate of thermal conductivity change, and a large absolute differential in thermal conductivity across the examined temperature range. Thus, the Ni—Mn based Heusler alloys of the present teachings uniquely, and reversible, alternate between operating as substantial thermal insulators at low temperature, and operating as substantial thermal conductors at high temperature. This property make the Ni—Mn based Heusler alloys of the present teachings superior materials for inclusion in the thermoregulating layer 120 of the thermal management systems 100 of the present disclosure.

It will generally be appreciated that, for the Ni—Mn based Heusler alloys of the present teachings, a L21 cubic high-temperature parent austenite phase transforms into a structurally modulated low symmetry martensite phase through martensitic transition (MT) upon cooling. The phonon (lattice) scattering is much less pronounced in the high temperature cubical phase, resulting in a large increase in thermal conductivity as temperature increases beyond its phase transition temperature. More importantly by tuning the content of element X, it is possible to tune its phase transition temperature near room temperature, making it a perfect candidate for thermal regulation applications in room temperature region.

A thermal management system 100 using a thermoregulating layer 120 having a Ni—Mn based Heusler alloy relies on the structural transition from the less-symmetric phase (monoclinic) phase to the symmetric (cubic) phase. After the phase transition, the mobility significantly increases, resulting in increases in both electronic ($\Lambda_e$) and lattice ($\Lambda_l$) thermal conductivity. Thus, the increase in total thermal conductivity ($\Lambda_{tot}=\Lambda_e+\Lambda_l$) is much larger than that has been observed in competing state of the art materials. These Ni—Mn alloys can be used as building blocks, via incorporation into a thermoregulating layer 120, for thermal management systems 100 to achieve very high ON/OFF ratio, or absolute conductivity differences, yielding superior thermal regulation performance.

Also disclosed is a method for constructing a thermal management system 100 having thermal management properties tuned to a heat generating device 110. The method includes a step of identifying a critical threshold temperature of the heat generating device 110, i.e. a temperature above which the heat generating device 110 suffers an unacceptable degradation in performance. For example, if the heat generating device 110 is a battery, the critical threshold temperature could be a temperature above which the battery suffers a pre-defined percent decrease in energy capacity, or any other property.

The method further includes a step of synthesizing, or otherwise providing, a plurality of Ni—Mn based Heusler alloys of the present teachings, each Ni—Mn based Heusler alloy of the plurality having a distinct composition. Differences in the compositions of the individual Ni—Mn based Heusler alloys of the plurality can be based on different stoichiometries (within the parameters set forth above), different identities of the dopant metal(s), M, or both.

The method further includes a step of measuring the change in thermal conductivity across a desired temperature range for each Ni—Mn based Heusler alloy of the plurality. This can be done, for example, as discussed above in relation to FIGS. 6A-6D. The method additionally includes a step of selecting a specific Ni—Mn based Heusler alloy from the plurality, based on a correlation between the change in thermal conductivity of the Ni—Mn based Heusler alloy and the critical threshold temperature of the heat generating device 110. This could be done, for example, by selecting a Ni—Mn based Heusler alloy that exhibits a desired high thermal conductivity at a temperature some predetermined amount lower than the critical threshold temperature of the heat generating device 110; or selecting a Ni—Mn based Heusler alloy that exhibits a maximum rate of change in thermal conductivity (i.e. transition temperature) at a temperature some predetermined amount lower than the critical threshold temperature of the heat generating device.

The method further includes a step of applying a thermoregulating layer 120, including the selected Ni—Mn based Heusler alloy, to one or more surfaces of the heat generating device 110, in a manner consistent with the structure of the thermal management system 100 described above.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A battery having a thermal management system comprising:
   a battery; and
   a thermoregulating layer in contact with or adjacent to one or more surfaces of the battery, the thermoregulating layer comprising a ternary alloy with a compound having a formula:

$Ni_xMn_{y-z}M_z$ wherein M is selected from the group consisting of indium, gallium, tin, and antimony; x is a value within a range of from 48 to 52, inclusive; y is a value within a range of from 48 to 52, inclusive; and z is a value within a range of from 13 to 15, inclusive.

2. The battery as recited in claim 1, wherein M comprises indium.

3. The battery as recited in claim 1, wherein M comprises tin.

4. The battery as recited in claim 1, wherein M comprises gallium.

5. The battery as recited in claim 1, wherein M comprises antimony.

6. The battery as recited in claim 1, wherein the thermoregulating layer contacts one or more surfaces of the battery.

7. The battery as recited in claim 1, wherein the battery is a Li-ion battery configured to supply power to an electric vehicle or hybrid electric vehicle.

8. The battery as recited in claim 1, wherein the thermoregulating layer comprises at least one compound selected from the group consisting of:
   $Ni_{51.7}Mn_{34.3}In_{13.9}$;
   $Ni_{50.7}Mn_{35.0}In_{14.3}$;

$Ni_{50.3}Mn_{35.6}In_{14.1}$; and $Ni_{50.3}Mn_{34.8}In_{14.9}$.

9. A thermal management system comprising:

a heat generating device; and a thermoregulating layer in contact with or adjacent to one or more surfaces of the heat generating device, wherein the thermoregulating layer is a thermal switch and comprises a ternary alloy with a compound having a formula:

$$Ni_xMn_{y-z}M_z$$

wherein M is selected from the group consisting of indium, gallium, tin, and antimony; x is a value within a range of from 48 to 52, inclusive; y is a value within a range of from 48 to 52, inclusive; and z is a value within a range of from 13 to 15, inclusive.

10. The thermal management system as recited in claim 9, wherein M comprises indium.

11. The thermal management system as recited in claim 9, wherein M comprises tin.

12. The thermal management system as recited in claim 9, wherein M comprises gallium.

13. The thermal management system as recited in claim 9, wherein M comprises antimony.

14. The thermal management system as recited in claim 9, wherein the thermoregulating layer contacts one or more surfaces of the heat generating device.

15. The thermal management system as recited in claim 9, wherein the thermoregulating layer comprises at least one compound selected from the group consisting of:

$Ni_{51.7}Mn_{34.3}In_{13.9}$;

$Ni_{50.7}Mn_{35.0}In_{14.3}$;

$Ni_{50.3}Mn_{35.6}In_{14.1}$; and $Ni_{50.3}Mn_{34.8}In_{14.9}$.

16. A method for constructing a thermal management system having thermal management properties tuned to a heat generating device, the method comprising:

identifying a critical threshold temperature of the heat generating device;

providing a plurality of Ni—Mn based Heusler alloys having a formula:

$$Ni_xMn_{y-z}M_z$$

wherein M is selected from the group consisting of indium, gallium, tin, and antimony; x is a value within a range of from 48 to 52, inclusive; y is a value within a range of from 48 to 52, inclusive; and z is a value within a range of from 13 to 15, inclusive;

measuring a change in thermal conductivity across a desired temperature range for each Ni—Mn based Heusler alloy of the plurality;

selecting a specific Ni—Mn based Heusler alloy from the plurality, based on a correlation between the change in thermal conductivity of the selected Ni—Mn based Heusler alloy and the critical threshold temperature of the heat generating device; and applying a thermoregulating layer, including the selected Ni—Mn based Heusler alloy, to one or more surfaces of the heat generating device.

17. The method as recited in claim 16, wherein at least two Ni—Mn based Heusler alloys of the plurality have a different metal, M.

18. The method as recited in claim 16, wherein the selecting step comprises selecting a Ni—Mn based Heusler alloy that exhibits a desired thermal conductivity at a temperature lower than the critical threshold temperature of the heat generating device.

19. The method as recited in claim 16, wherein the applying step comprises placing the thermoregulating layer in coating contact with one or more surfaces of the heat generating device.

20. The method as recited in claim 16, wherein the plurality of Ni—Mn based Heusler alloys comprises at least one compound selected from the group consisting of:

$Ni_{51.7}Mn_{34.3}In_{13.9}$;

$Ni_{50.7}Mn_{35.0}In_{14.3}$;

$Ni_{50.3}Mn_{35.6}In_{14.1}$; and $Ni_{50.3}Mn_{34.8}In_{14.9}$.

* * * * *